D. HANAUER.
FOLDING TOP FOR VEHICLES.
APPLICATION FILED JULY 11, 1914.

1,190,890.

Patented July 11, 1916.
3 SHEETS—SHEET 2.

Witnesses:
Thomas Veitch
Mae Hirsch

Inventor
Darwin Hanauer

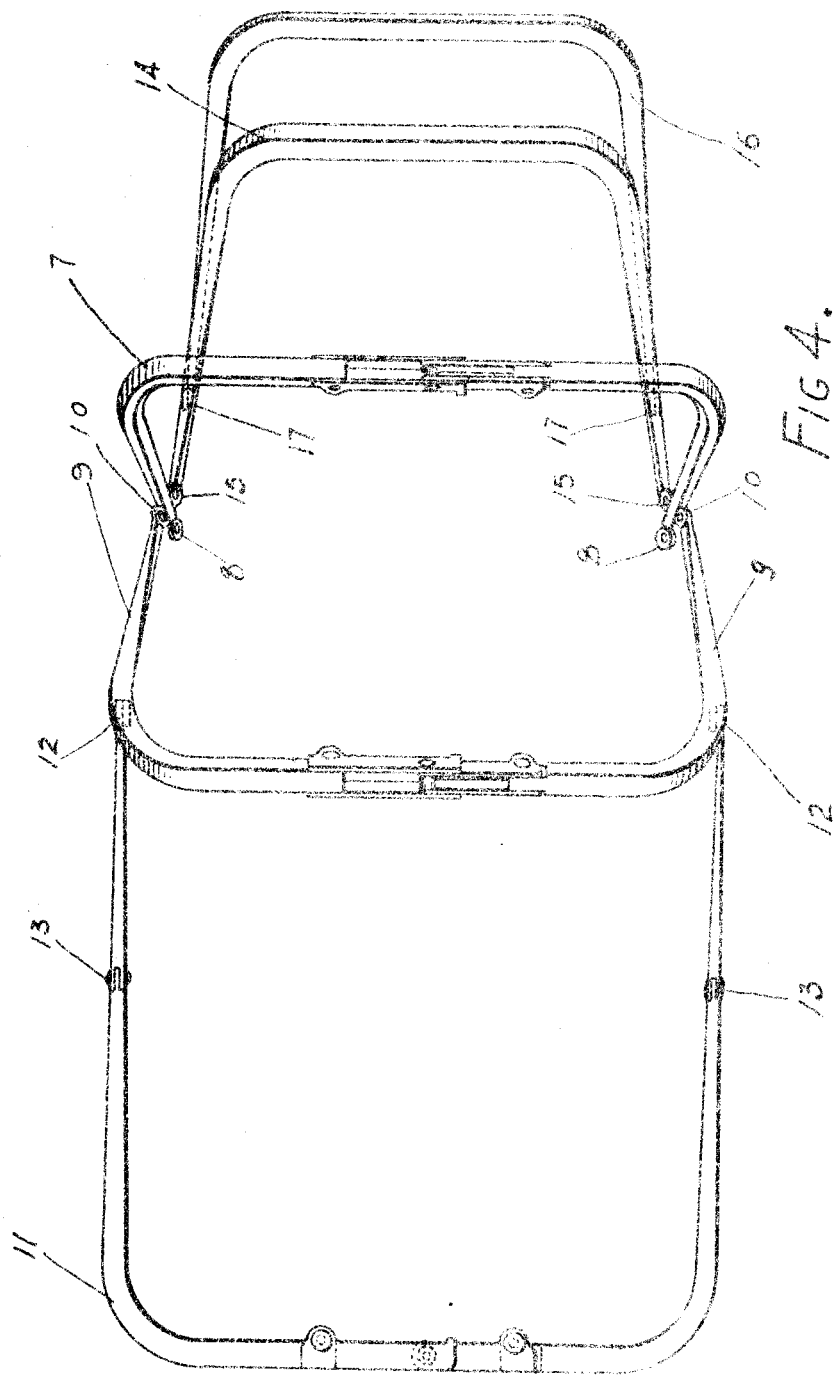

UNITED STATES PATENT OFFICE.

DARWIN HANAUER, OF KINGSTON, NEW YORK, ASSIGNOR TO ENTZ MOTOR PATENTS CORPORATION, A CORPORATION OF NEW YORK.

FOLDING TOP FOR VEHICLES.

1,190,890. Specification of Letters Patent. Patented July 11, 1916.

Application filed July 11, 1914. Serial No. 850,504.

*To all whom it may concern:*

Be it known that I, DARWIN HANAUER, a citizen of the United States, and a resident of Kingston, in the county of Ulster and State of New York, have invented certain new and useful Improvements in Folding Tops for Vehicles, of which the following is a specification.

My invention relates to improvements in folding tops for vehicles, in which the bows are supported from the body portion of the vehicle and are covered with a flexible protective material.

The objects of my invention are: first, to provide a top for protecting the two front seats, and also a single rumble or rear seat, or a two passenger rear seat; second, to provide a receptacle for completely housing the top when folded; third, to provide means for carrying the folded top inside of the normal body lines of the vehicle body, so that when the top is folded and in the receptacle, there will be no indication from the appearance of the body that a top is carried by the vehicle, or that any additional provision is made for housing the top; and fourth, to protect the top from the elements, or from oil, dust and mud. I attain these objects by the mechanism illustrated in the accompanying drawings, in which—

Figure 1:
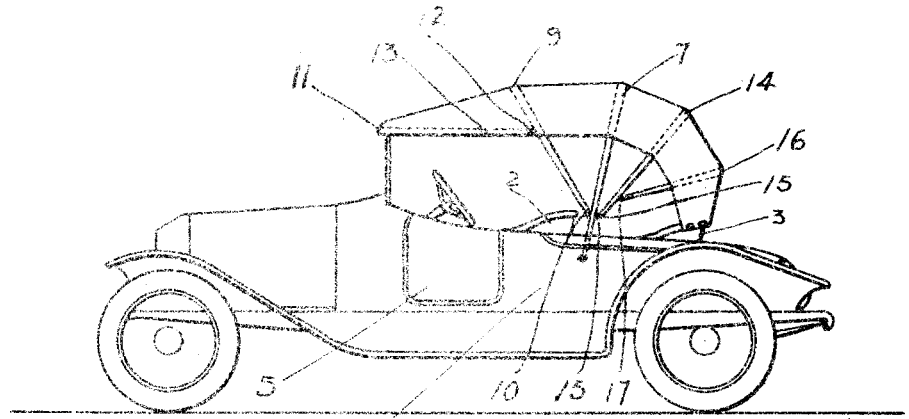
Figure 2:
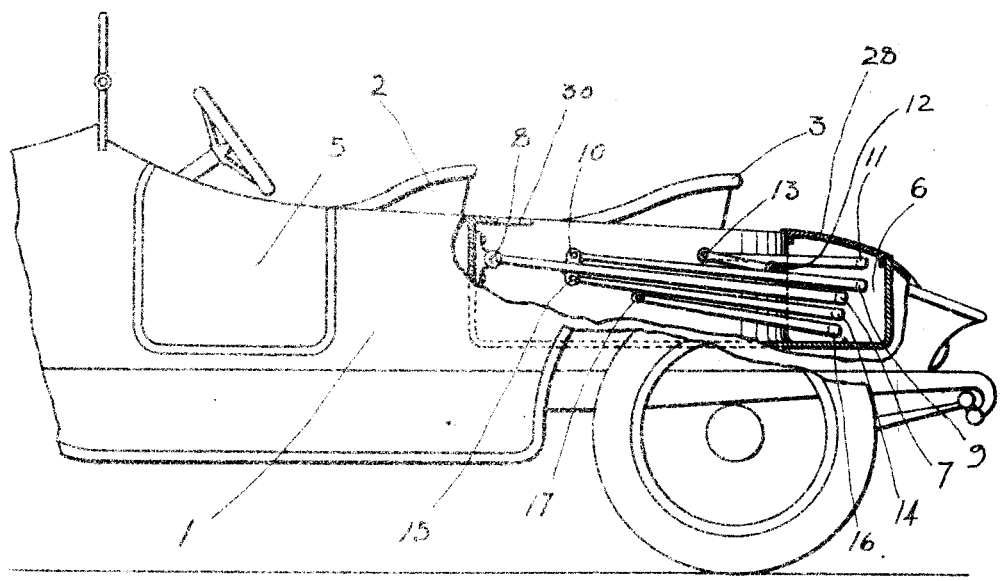
Figure 5:
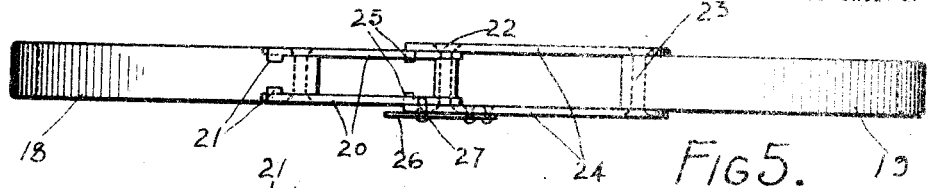
Figure 6:
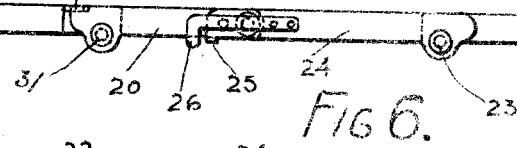
Figure 7:
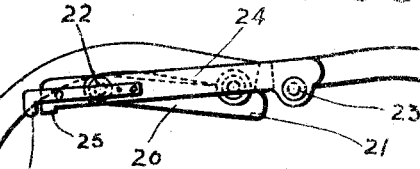
Figure 3:
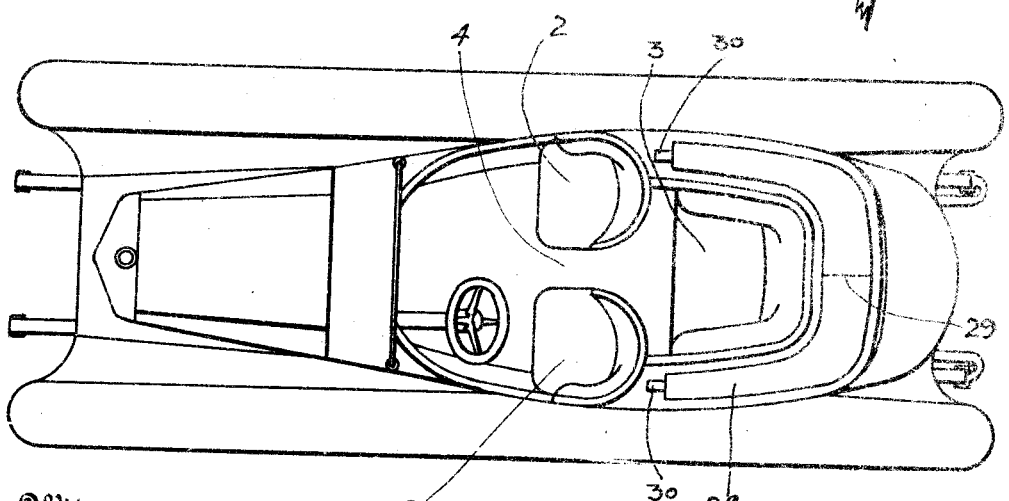

Figure 1 is a side view of the motor vehicle with the top raised; Fig. 2 is a partial side view with a broken section of the receptacle showing the top bows folded in same;
Fig. 3 is a plan view of a motor vehicle showing the plan of the top receptacle, with the cover over same; Fig. 4 is a plan view of the skeleton frame work of the top, showing some of the bows plain, and others with the special means for changing the width to enable them to be stowed into the receptacle; Figs. 5 and 6, show the plan and side views respectively of the joints in the wide bows for narrowing or changing the width of same; and Fig. 7 shows a method of changing the width of the wide bow through the means of a folding collapsible connection.

Similar numerals refer to similar parts throughout the several views.

The body 1, of the motor vehicle, to which my improved top is applied, is of the three seated type, having forward seats, 2, 2, and rear or rumble seat 3. This rumble seat may be of a width to accommodate one passenger, or may be wide enough to seat two or more passengers. Access to this rear seat is obtained by separating seats 2, 2, and leaving a passageway between them, which is reached through the door 5, and the body 1.
Around the seat 3, and between it and the normal side or contour lines of the body 1, a receptacle 6, is provided for containing the entire top when it is folded back out of use. This receptacle is so constructed that it is contained inside of what is ordinarily the normal sides and deck of the body, so that no noticeable or unsightly protuberance is needed for housing the folded top.

This top, for the type of motor vehicle illustrated, consists of a main bow 7, which is pivoted at 8, at the forward end of the receptacle 6. This main bow 7, carries a bow 9, pivoted at the front of 7, at position 10. The bow 9, in turn carries a forwardly extending bow 11, pivoted to the bow 9 at the point 12. This bow is jointed at 13, so that the crown will fold to the same height as the bow 9; as illustrated in Fig. 2.

From the rear of the bow 7, extends the bow 14, pivoted to the bow 7, at 15, and from 14 extends the bow 16, pivoted to the bow 14 at the point 17.

In order that the top may, when raised, fully protect the forward seats 2, 2, and when lowered may be completely contained within the relatively narrow receptacle 6, I provide means such for example as those illustrated in Figs. 4 to 7, inclusive, for varying the width of one or more of the foremost bows, so that these bows may be made wide enough to span the forward seats when the top is raised, and may be reduced in width sufficiently to enable them to fit within the receptacle 6 when the top is lowered.

Each of the collapsible or telescopic bows 7, 9 and 11 is formed from two equal parts 18 and 19. Pivoted to 18, at the hinge 31, is a member 20, which is permitted to swing inwardly only, and is prevented from moving outwardly beyond the position shown in Fig.

6, by the stops 21. Pivoted between the hinge joint 22, of the member 20, and the end of the bow 19, at the joint 23, is a swinging member 24, carrying stop lugs 25, and a spring lock 26, having a bolt 27, for engaging the holes in both 20 and 24, which aline when the swinging frames are in the position illustrated in Fig. 6, this being the full width position of the bow.

When the frames 20 and 24 are swung inwardly and to one side, as shown in Fig. 7, the ends of 18 and 19 are brought close together, and the bow is then made narrow enough to fit into the receptacle, when the top is folded. The receptacle 6 is provided with a cover 28, which may be in one piece hinged to the body at the rear, or made to lift off. This cover may also be divided at the point shown by the dotted line 29, in Fig. 3, and each half hinged at the sides to open outwardly from each other. After the top has been raised the cover 28 may again be placed in position, as shown in Fig. 3. Thus any pieces of luggage or other articles, which it is found convenient to carry in the receptacle, are protected, and the receptacle is also rendered inconspicuous. At the forward edge of this receptacle are provided slots 30, 30, which engage the bow 7, when it is in the raised position, and provide increased lateral rigidity to the top when raised.

While the top illustrated is permanently pivoted to the body through one bow, I do not limit myself to this construction, as my telescopic or collapsible bows may be used with any folding top for any vehicle, where it is desired to fold the top into a receptacle built into the body, or where it is desired, for any reason, to have the folded top narrower than when it is raised and in use.

I do not limit myself to the type of folding joint as illustrated in Figs. 5, 6, and 7, as I may use any method or means of collapsing, telescoping, or changing the width of the bows. Neither do I limit myself to the number of bows which I telescope or change in width, as one or any number, up to the full equipment used in the complete top, may be so narrowed, collapsed, or telescoped.

Having thus described my invention, what I claim as new herein, and desire to secure by Letters Patent is;

1. The combination with a vehicle body having a receptacle inclosed therein, of a foldable top for said body, including one or more bows, said top when raised being wider at its widest point than said receptacle, connecting means operative both when the top is raised and when it is lowered for connecting the top to the body, and means for varying the width of one or more of said bows, whereby said top may, when lowered, be received within said receptacle.

2. The combination with a vehicle body having a receptacle inclosed therein, of a foldable top for said body, pivoted thereto and including one or more bows, said top when raised being wider at its widest point than said receptacle and means for varying the width of one or more of said bows, whereby said top may, when lowered, be received within said receptacle.

3. The combination with a vehicle body having a seating compartment and a receptacle partially surrounding said compartment; of a foldable top for said body pivoted thereto and including one or more bows, said top when raised being wider, at its widest point, than said receptacle; and means for varying the width of one or more of said bows whereby said top may when lowered be received within said receptacle.

4. The combination with a vehicle body having a receptacle inclosed therein; of a foldable top for said body pivoted within said receptacle and including one or more bows, said top when raised being wider, at its widest point, than said receptacle; and means for varying the width of one or more of said bows whereby said top may, when lowered, be wholly received within said receptacle.

5. The combination with a vehicle body having a seating compartment and a receptacle partially surrounding said compartment; of a foldable top for said body including one or more bows, said top when raised being wider, at its widest point, than said receptacle; connecting means operative both when the top is raised and when it is lowered for connecting the top to the body and means for varying the width of one or more bows whereby said top may when lowered be received within said receptacle; and a cover for said receptacle for protecting said top when contained therein.

6. The combination with a vehicle body having a receptacle inclosed therein; of a foldable top for said body pivoted within the receptacle and including one or more bows, said top when raised being wider, at its widest point, than said receptacle; means for varying the width of one or more bows whereby said top may, when lowered, be received in said receptacle; and a cover for said receptacle adapted to be placed in position when the top is lowered, or when the top is raised to protect the contents of said receptacle.

7. The combination with a vehicle body having a front seating compartment, a rear seating compartment of less width than said front compartment, and a receptacle partly surrounding said rear compartment; of a foldable top for said body including one or more bows, said top when raised being wider, at its widest point, than said receptacle; connecting means operative both when the top is raised and when it is lowered for connecting the top to the body and means for varying the width of one or more of said bows whereby the top may when lowered be received within said receptacle.

Signed at New York city in the county of New York and State of New York this 6th day of July A. D. 1914.

DARWIN HANAUER.

Witnesses:
 THOMAS VEITCH,
 MAE HIRSCH.